US012072657B2

(12) United States Patent
Onaka

(10) Patent No.: US 12,072,657 B2
(45) Date of Patent: Aug. 27, 2024

(54) IMAGE FORMING APPARATUS

(71) Applicant: Konica Minolta, Inc., Tokyo (JP)

(72) Inventor: Hiromitsu Onaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 169 days.

(21) Appl. No.: 17/733,574

(22) Filed: Apr. 29, 2022

(65) Prior Publication Data

US 2022/0390888 A1 Dec. 8, 2022

(30) Foreign Application Priority Data

Jun. 3, 2021 (JP) ................................ 2021-093608

(51) Int. Cl.
*G03G 15/00* (2006.01)

(52) U.S. Cl.
CPC ................................ *G03G 15/6567* (2013.01)

(58) Field of Classification Search
CPC ........................... G03G 15/00; G03G 15/6567
See application file for complete search history.

(56) References Cited

U.S. PATENT DOCUMENTS

2007/0086071 A1* 4/2007 Gila ...................... G06T 7/0004 358/518
2008/0006992 A1* 1/2008 Inoue ..................... B65H 9/002 271/228
2010/0158594 A1* 6/2010 Kobayashi ......... G03G 15/6567 271/229
2016/0159598 A1* 6/2016 Yamane ............ G03G 15/6561 271/227
2016/0236889 A1* 8/2016 Nakamura ............. G03G 15/55
2019/0315586 A1* 10/2019 Yamane ................... B65H 9/20

FOREIGN PATENT DOCUMENTS

JP 2018-205392 A 12/2018

* cited by examiner

*Primary Examiner* — David H Banh
(74) *Attorney, Agent, or Firm* — Squire Patton Boggs (US) LLP

(57) ABSTRACT

To provide an image forming apparatus capable of sufficiently correcting deviation of a recording material by an oscillation operation of a registration roller.

Configuring an image forming apparatus including: a conveyor that conveys a recording material; a transferer that includes a transfer roller that transfers a toner image onto the recording material; a fixer that includes a fixing roller that fixes the toner image formed on the recording material; a deviation detector that detects a position of the recording material in a conveyance intersecting direction; a deviation corrector that is located on an upstream side of the transferer and moves the recording material in the conveyance intersecting direction to correct deviation of the recording material; and a controller that controls a drive amount of the deviation corrector on the basis of a detection result of the deviation detector and the pressure contact force of a nipper nipping the recording material being conveyed.

12 Claims, 7 Drawing Sheets

FIG. 3

| CONDITION | PRESSURE CONTACT FORCE INFORMATION | | | | | | RECORDING MATERIAL PHYSICAL PROPERTY INFORMATION | | | | | CORRECTION AMOUNT |
|---|---|---|---|---|---|---|---|---|---|---|---|---|
| | NIPPER a | | NIPPER b | | ··· | | | | | | | |
| | PRESSURE CONTACT FORCE | DISTANCE | PRESSURE CONTACT FORCE | DISTANCE | ··· | | TYPE | THICKNESS | BASIS WEIGHT | SIZE | SURFACE SMOOTHNESS | |
| 1 | Pa_1 | d_a | P_b1 | d_b | ··· | | p1 | t1 | w1 | s1 | Sm1 | 1.00 |
| 2 | Pa_2 | d_a | P_b1 | d_b | ··· | | p1 | t1 | w1 | s1 | Sm1 | 1.20 |
| 3 | Pa_3 | d_a | P_b1 | d_b | ··· | | p1 | t1 | w1 | s1 | Sm1 | 1.40 |
| 4 | Pa_1 | d_a | P_b2 | d_b | ··· | | ··· | ··· | ··· | ··· | ··· | 1.05 |
| 5 | Pa_2 | d_a | P_b2 | d_b | ··· | | ··· | ··· | ··· | ··· | ··· | 1.25 |
| 6 | Pa_3 | d_a | P_b2 | d_b | ··· | | ··· | ··· | ··· | ··· | ··· | 1.45 |
| 7 | Pa_1 | d_a | P_b3 | d_b | ··· | | ··· | ··· | ··· | ··· | ··· | 1.10 |
| 8 | Pa_2 | d_a | P_b3 | d_b | ··· | | ··· | ··· | ··· | ··· | ··· | 1.30 |
| 9 | Pa_3 | d_a | P_b3 | d_b | ··· | | ··· | ··· | ··· | ··· | ··· | 1.50 |
| ··· | ··· | ··· | ··· | ··· | ··· | | ··· | ··· | ··· | ··· | ··· | ··· |

IMAGE FORMING APPARATUS

CROSS-REFERENCE TO RELATED APPLICATIONS

The entire disclosure of Japanese patent Application No. 2021-93608, filed on Jun. 3, 2021, is incorporated herein by reference in its entirety.

BACKGROUND

Technological Field

The present invention relates to an image forming apparatus.

Description of the Related Art

In an image forming apparatus, when a recording material is conveyed from a sheet feeder or a reverse path to a transferer, the recording material may be deviated in a direction (hereinafter, sometimes referred to as a conveyance intersecting direction, a recording material width direction, and a main scanning direction) orthogonal to a conveyance direction due to a mechanical factor of the apparatus or the like. In a case where image formation is performed in a state where deviation of the recording material occurs as described above, the image formation position with respect to the recording material is displaced from the original appropriate position.

Therefore, in the image forming apparatus, in order to accurately align an image and the recording material in consideration of the deviation of the recording material, registration oscillation correction is performed in which the recording material is nipped by a registration roller and is oscillated in the conveyance intersecting direction to correct the deviation of the recording material. In the registration oscillation correction, control is performed in which a deviation sensor is disposed on the downstream side of the registration roller, and the recording material is oscillated in the conveyance intersecting direction on the basis of the deviation amount of the recording material to correct the deviation of the recording material.

However, in the registration oscillation correction described above, the registration roller is oscillated before the leading end of the recording material reaches a secondary transfer roller so that the position of the end portion of the recording material is aligned. By simply performing oscillation before the recording material reaches the secondary transfer roller as described above, the recording material may be deviated after reaching the secondary transfer roller due to misalignment of the secondary transfer roller or a fixing roller or a difference in roller diameter of each roller in the recording material width direction. In particular, a long sheet is susceptible to this influence, and the recording material is likely to deviate in the main scanning direction even after reaching the secondary transfer roller. As a result, in the conventional registration oscillation correction, the image formation position on the recording material may be displaced during an image formation job.

Therefore, there has been proposed an image forming apparatus that performs an oscillation operation of a registration roller even after a recording material passes through a secondary transfer roller to correct deviation of the recording material (see, for example, Patent Literature 1). In this image forming apparatus, an image reader reads a recording material that has passed through a secondary transfer roller and to which an image has been transferred, and detects an image formation position on the recording material. Then, the oscillation control information of the registration roller is corrected on the basis of the reading result of the formed image, and the oscillation operation is performed with the drive amount corresponding to the displacement amount of the image formation position on the recording material.

Related Art Literature

Patent Literature

Patent Literature 1: JP 2018-205392 A

SUMMARY

However, in the image forming apparatus, the pressure contact force of the secondary transfer roller, the fixing roller, a conveyance roller, and the like is not constant because it changes depending on image formation conditions. Therefore, depending on the pressure contact force of each roller, the degree of slippage generated between the recording material and the roller during the oscillation operation varies. For example, as the pressure contact force of the roller increases, the resistance related to the movement of the recording material during the oscillation operation increases, and the movement amount of the recording material decreases. As a result, even when the oscillation operation of the registration roller is performed with the drive amount based on the displacement amount of the image formation position on the recording material, the deviation of the recording material cannot necessarily be sufficiently eliminated depending on the movement amount of the recording material changed by the pressure contact force of the roller.

In order to solve the above-described problem, the present invention provides an image forming apparatus capable of sufficiently correcting deviation of a recording material by an oscillation operation of a registration roller.

An image forming apparatus of the present invention includes: a conveyor that conveys a recording material; a transferer that includes a transfer roller that transfers a toner image onto the recording material; a fixer that includes a fixing roller that fixes the toner image formed on the recording material; a deviation detector that detects a position of the recording material in a conveyance intersecting direction; a deviation corrector that is located on an upstream side of the transferer and moves the recording material in the conveyance intersecting direction to correct deviation of the recording material; and a controller that controls a drive amount of the deviation corrector on the basis of a detection result of the deviation detector and the pressure contact force of a nipper nipping the recording material being conveyed.

According to an embodiment of the present invention, it is possible to provide an image forming apparatus capable of sufficiently correcting deviation of a recording material by an oscillation operation of a registration roller.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is an oscillation control table for correcting an oscillation operation of a registration roller;

DETAILED DESCRIPTION OF EMBODIMENTS

Hereinafter, one or more embodiments of the present invention will be described with reference to the drawings. However, the scope of the invention is not limited to the disclosed embodiments.

Hereinafter, examples of modes for carrying out the present invention will be described, but the present invention is not limited to the examples described below.

Note that the description will be given in the order described below.

1. First embodiment of image forming apparatus
2. Second embodiment of image forming apparatus <1. First Embodiment of Image Forming Apparatus>

Figure 1:
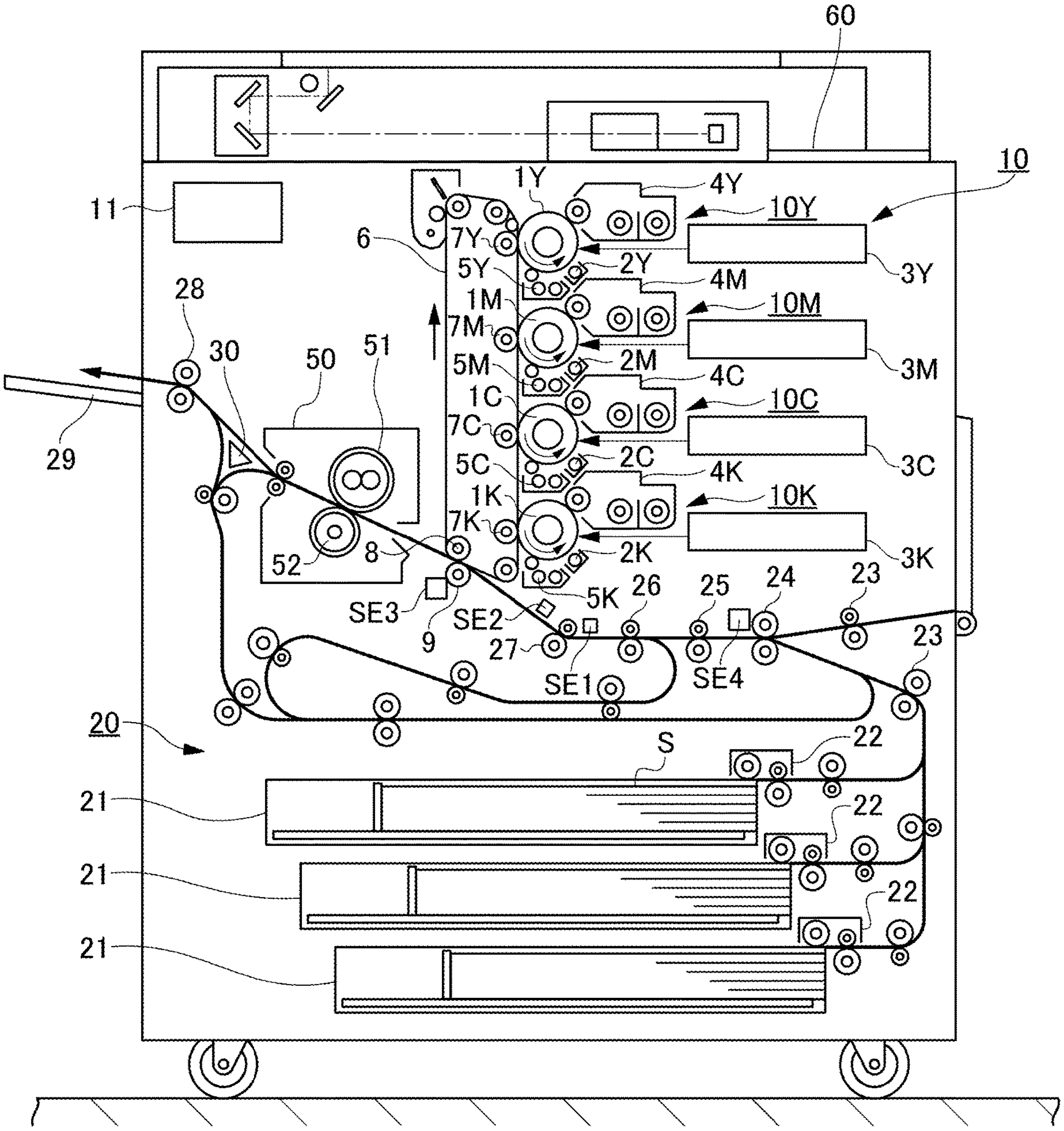
FIG. 1 is a diagram illustrating a schematic configuration of an image forming apparatus.

Hereinafter, a first embodiment of an image forming apparatus will be described. FIG. 1 is a schematic configuration diagram of an image forming apparatus of the present embodiment. An image forming apparatus 100 illustrated in FIG. 1 is an electrophotographic image forming apparatus 100, and is a so-called tandem type color image forming apparatus that forms a color image by arranging a plurality of photoreceptors in a vertical direction so as to face an intermediate transfer belt. The image forming apparatus 100 mainly includes an image former 10, a controller 11, a recording material conveyor 20, and a fixer 50, which are housed in one housing.

The image former 10 includes four image forming units 10Y, 10M, 10C, and 10K, an intermediate transfer belt 6, a secondary transfer roller 9, and the like. The image forming units 10Y, 10M, 10C, and 10K include an image forming unit 10Y that forms a yellow (Y) image, an image forming unit 10M that forms a magenta (M) image, an image forming unit 10C that forms a cyan (C) image, and an image forming unit 10K that forms a black (K) image.

The image forming unit 10Y includes a photoreceptor drum 1Y, and a charger 2Y, an optical writer 3Y, a developer 4Y, and a drum cleaner 5Y disposed around the photoreceptor drum 1Y. Similarly, the image forming units 10M, 10C, and 10K include respectively photoreceptor drums 1M, 1C, and 1K, and chargers 2M, 2C, and 2K, optical writers 3M, 3C, and 3K, developers 4M, 4C, and 4K, and drum cleaners 5M, 5C, and 5K disposed around the photoreceptor drums 1M, 1C, and 1K.

The surfaces of the photoreceptor drums 1Y, 1M, 1C, and 1K are uniformly charged by the chargers 2Y, 2M, 2C, and 2K, and latent images are formed on the photoreceptor drums 1Y, 1M, 1C, and 1K by scanning exposure by the optical writers 3Y, 3M, 3C, and 3K. Furthermore, the developers 4Y, 4M, 4C, and 4K develop the latent images on the photoreceptor drums 1Y, 1M, 1C, and 1K by developing with toner. Thus, a toner image of a predetermined color corresponding to any of yellow, magenta, cyan, and black is formed on the photoreceptor drums 1Y, 1M, 1C, and 1K. The toner images formed on the photoreceptor drums 1Y, 1M, 1C, and 1K are primarily transferred to predetermined positions on the rotating intermediate transfer belt 6 by primary transfer rollers 7Y, 7M, 7C, and 7K.

The toner image of each color transferred onto the intermediate transfer belt 6 is transferred by the secondary transfer roller 9 to a recording material S conveyed at a predetermined timing by the recording material conveyor 20 described below.

The secondary transfer roller 9 is disposed on the back surface (surface opposite to the image formation surface) side of the recording material S, and is disposed in pressure contact with a counter roller 8 disposed on the back surface (surface opposite to the transfer surface) side of the intermediate transfer belt 6 via the intermediate transfer belt 6. By pressure contact between the secondary transfer roller 9 and the counter roller 8, a nipper (hereinafter referred to as a “transfer nipper”) is formed between the secondary transfer roller 9 and the intermediate transfer belt 6. Then, by driving the intermediate transfer belt 6 and the secondary transfer roller 9, transfer of the toner image to the recording material S and conveyance of the recording material S are performed at the transfer nipper.

The recording material conveyor 20 conveys the recording material S along a conveyance path of the recording material S. The recording material S is accommodated in a sheet feeding tray 21. The recording material S accommodated in the sheet feeding tray 21 is taken in by a sheet feeder 22 and sent to the conveyance path. Further, the recording material S may be accommodated in a sheet feeding tray of an external sheet feeding apparatus (not illustrated) connected to the image forming apparatus 100, supplied from the sheet feeding apparatus to the image forming apparatus 100, and sent to the conveyance path.

On the upstream side of the transfer nipper in the conveyance path, a plurality of pairs of rollers (roller pairs) pressed against each other is provided as conveyance rollers for conveying the recording material S. The roller pair conveys the recording material S by rotationally driving at least one roller through a drive mechanism mainly including an electric motor. Further, the roller pairs constituting individual conveyors are configured to be able to switch the state between the rollers between a pressure contact state and a separated state. Then, a nipper (hereinafter referred to as a “conveyance nipper”) is formed at each roller pair by pressure contact of the roller pair.

The recording material conveyor 20 is provided with intermediate conveyance rollers 23, 24, and 25 and a loop roller 26 as conveyance rollers from the upstream side to the downstream side in the conveyance path of the recording material S. Furthermore, the recording material conveyor 20 is provided with a registration roller 27 that adjusts the conveyance timing of the recording material S and corrects the inclination of the conveyed recording material S as a conveyance roller. Note that the recording material conveyor 20 can widely adopt a configuration in which the conveyance nipper is formed by a pair of rotary members, such as a combination of a roller pair via a belt or a combination of a belt and a roller, in addition to the configuration of a roller pair.

In such a conveyance path of the recording material conveyor 20, the recording material S fed from the sheet feeding tray 21 or the sheet feeding tray of the sheet feeding apparatus is sequentially conveyed by the plurality of intermediate conveyance rollers 23, 24, and 25 and the loop roller 26 provided from the upstream side to the downstream side. When the leading end of the recording material S approaches the registration roller 27, the recording material S conveyed by the loop roller 26 or the like abuts against the registration roller 27 in a rotation stop state. Then, as the loop roller 26 continues to rotate for a predetermined time, a loop is formed on the recording material S. The bending of the leading end of the recording material S is corrected by the action of the loop formation (skew correction).

In the vicinity of the upstream side of the registration roller 27, a registration sensor SE1 that detects the arrival of the recording material S is provided.

Further, a position detection sensor SE2 that detects the arrival of the recording material S and the position of a side end portion of the recording material S in a recording material width direction CD is provided in the vicinity of the downstream side of the registration roller 27. As the position detection sensor SE2, for example, a linear image sensor (for example, a charge-coupled device (CCD) line sensor or the like) in which a plurality of light receiving elements is linearly arranged along the recording material width direction CD is used.

Further, the recording material conveyor 20 includes a medium sensor SE4 as a recording material characteristic detector capable of detecting the recording material characteristics of the recording material S sent to the conveyance path. It is sufficient if the medium sensor SE4 is disposed on the upstream side of the loop roller 26. As the medium sensor SE4, a conventionally known sensor capable of detecting the recording material characteristics of the recording material S can be used.

Next, when the registration roller 27 starts to rotate at a predetermined timing so as to be synchronized with the toner image carried by the intermediate transfer belt 6, the intermediate conveyance rollers 23, 24, and 25 and the loop roller 26 are switched from the pressure contact state to the separated state. That is, after the loop roller 26 transitions to the separated state, the recording material S is conveyed only by the registration roller 27. The registration roller 27, as an oscillation roller, performs the oscillation operation described below while conveying the recording material S, and conveys the recording material S to the transfer nipper between the intermediate transfer belt 6, which is an image carrier, and the secondary transfer roller 9, which is a transferer.

The fixer 50 performs fixing processing on the recording material S to which the toner image has been transferred, that is, the recording material S sent from the transfer nipper. The fixer 50 includes a fixing roller 51 disposed on the image formation surface side of the recording material S, a pressure roller 52 disposed at a position facing the fixing roller 51 via the conveyed recording material S, and a heater (illustration omitted) that heats the fixing roller 51. When the pressure roller 52 is pressed against the fixing roller 51, a nipper (hereinafter, referred to as a "fixing nipper") is formed between the fixing roller 51 and the pressure roller 52.

In the process of conveying the recording material S, the fixer 50 fixes the toner image on the recording material S by heating and pressurizing by the fixing roller 51 and the pressure roller 52 at the fixing nipper. The recording material S subjected to the fixing processing by the fixer 50 is discharged to a sheet discharge tray 29 attached to an outer side surface of the housing by a sheet discharge roller 28.

Furthermore, the secondary transfer roller 9, the intermediate conveyance rollers 23, 24, and 25, the loop roller 26, and the fixing roller 51 and the pressure roller 52 of the fixer 50 are provided with a pressure detection sensor SE3 as a pressure detector for detecting the pressure contact force of each nipper. The pressure detection sensor SE3 detects, for example, the pressure contact force of the nipper disposed in each roller.

For example, a photointerrupter that detects a rotation angle of a pressure switching cam can be used as the pressure detection sensor SE3. Further, the pressure detection sensor SE3 may directly detect the pressure of the nipper using a pressure transducer or the like.

Further, as a configuration of the pressure detector that detects the pressure contact force of the nipper, for example, the drive amount of a pressure contact motor of each roller, which is not illustrated, may be used in addition to the pressure detection sensor SE3 described above, or a configuration in which the pressure amount of the nipper is calculated by detecting a variation in driving torque of the roller may be used.

Note that although only the pressure detection sensor SE3 that detects the pressure contact force of the secondary transfer roller 9 is illustrated in FIG. 1, the pressure detection sensor SE3 may also be provided at the intermediate conveyance rollers 23, 24, and 25, the loop roller 26, and the fixer 50.

[System Block Diagram]

Figure 2:
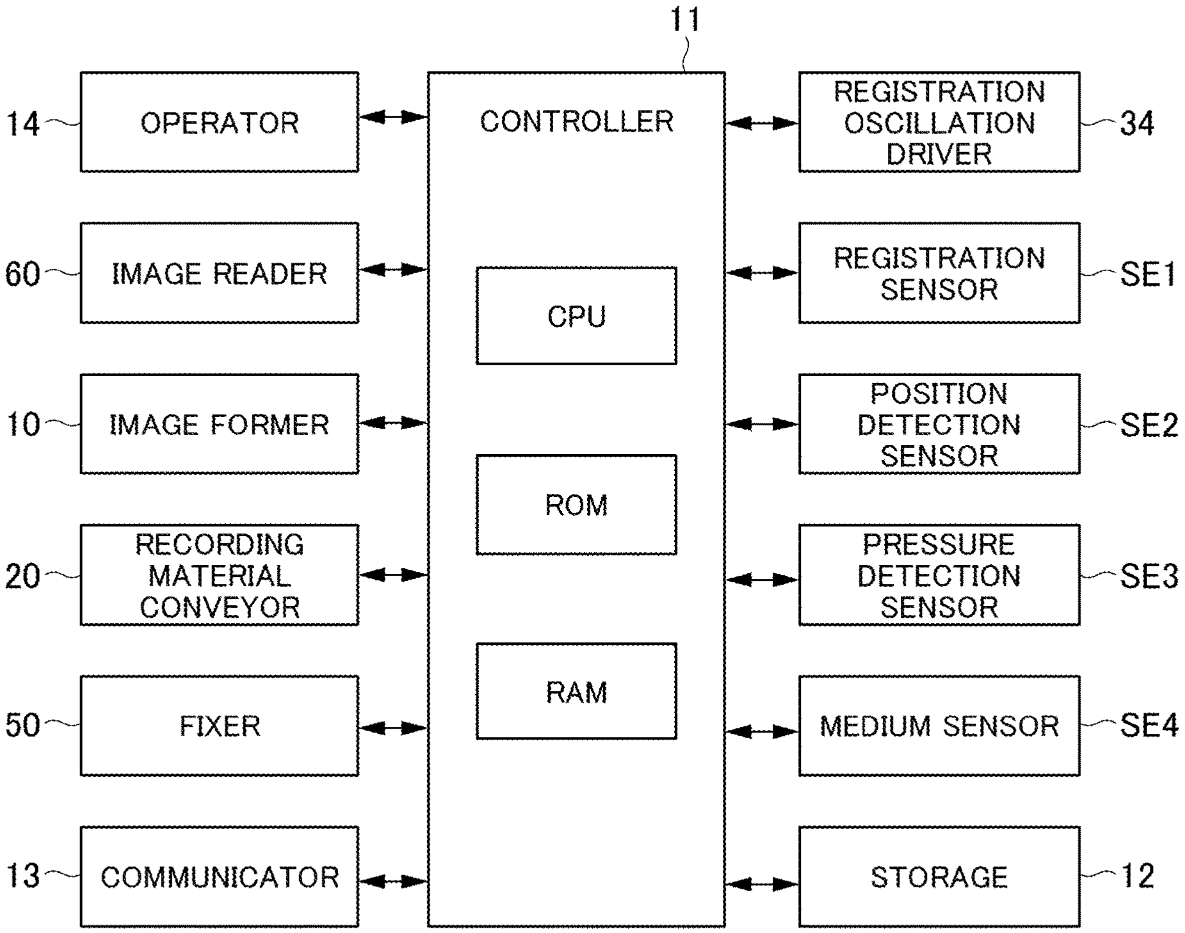
FIG. 2 is a block diagram illustrating a configuration of an image forming apparatus.

FIG. 2 illustrates a system block diagram of the image forming apparatus 100. As illustrated in FIG. 2, the image forming apparatus 100 includes the controller 11, a storage 12, a communicator 13, an operator 14, the image former 10, the recording material conveyor 20, the fixer 50, an image reader 60, the registration sensor SE1, the position detection sensor SE2, the pressure detection sensor SE3, the medium sensor SE4, and a registration oscillation driver 34.

The storage 12, the communicator 13, the operator 14, the image former 10, the recording material conveyor 20, the fixer 50, the image reader 60, the registration sensor SE1, the position detection sensor SE2, the pressure detection sensor SE3, the medium sensor SE4, and the registration oscillation driver 34 are communicably connected to the controller 11, and control such as drive control and signal processing is performed by the controller 11.

The controller 11 includes a central processing unit (CPU), random access memory (RAM), read only memory (ROM), and the like. The CPU of the controller 11 reads a system program or various processing programs stored in the ROM or the storage 12, loads the program to the RAM, and centrally controls the operation of each unit of the image forming apparatus 100 according to the loaded program. For example, when a job execution command is input by the operator 14, the controller 11 executes a job and performs control to form a toner image on the recording material S on the basis of image data input from the communicator 13 or the like. Further, when a job execution command is input by the operator 14, the controller 11 executes oscillation control processing to be described below, and performs oscillation control of the registration roller 27 during execution of the job.

The storage 12 includes nonvolatile semiconductor memory, a hard disk drive (HDD), or the like, and stores parameters, data, and the like necessary for each unit in addition to various programs executed by the controller 11. For example, the storage 12 stores oscillation control information for controlling the oscillation operation of the registration roller 27.

For example, as the oscillation control information of the oscillation operation (first oscillation operation) of the registration roller 27 before the recording material S enters the secondary transfer roller 9, information for calculating the oscillation direction (+, −), the oscillation speed, the drive amount, and the like of the registration oscillation driver 34 according to the displacement amount (deviation amount) between the position of the side end portion of the recording material S and a target position Tp is stored.

Further, as the oscillation control information for controlling the oscillation operation (second oscillation operation) of the registration roller 27 after the recording material S enters the secondary transfer roller 9, an oscillation control table for correcting the oscillation operation of the registration roller 27 on the basis of the pressure contact force of the nipper that nips the recording material S being conveyed is stored in addition to the oscillation control information according to the displacement amount between the position of the side end portion of the recording material S and the target position Tp.

FIG. 3 illustrates an example of the oscillation control table for correcting the oscillation operation of the registration roller 27. In the oscillation control table illustrated in FIG. 3, the correction amounts corresponding to the pressure contact forces of the nippers and the recording material characteristics are described.

After the recording material S enters the secondary transfer roller 9, the controller 11 controls the registration roller 27 to oscillate at a plurality of preset timings (referred to as oscillation timings) Therefore, the oscillation control table illustrated in FIG. 3 stores the correction amounts for correcting the oscillation operation of the registration roller 27 on the basis of the pressure contact force information of the nipper nipping the recording material and the recording material physical property information.

In the oscillation control table illustrated in FIG. 3, as an example of the pressure contact force information, the pressure contact force at each nipper (nipper a and nipper b) such as the transfer nipper, the fixing nipper, and the conveyance nipper, and the distance between each nipper and the registration roller 27 are stored. In the oscillation control table, a type, a thickness, a basis weight, a recording material size, and a surface smoothness are stored as examples of the recording material physical property information. Then, the correction amounts are calculated according to the stored pressure contact force and distance of each nipper and conditions of the recording material physical property information.

Therefore, in the second oscillation operation described above, the controller 11 corrects the oscillation control information according to the displacement amount between the position of the side end portion of the recording material S and the target position Tp stored in the storage 12 on the basis of the correction amount stored in the oscillation control table, and controls the oscillation operation of the registration roller 27.

Thus, the deviation of the recording material S can be corrected in consideration of the magnitude of the resistance due to the pressure contact force of the nipper with respect to the movement of the recording material S at the time of the oscillation operation, and the toner image can be formed at the optimum position of the recording material S.

Further, depending on not only the pressure contact force of the nipper but also the recording material characteristics of the recording material S, even when the pressure contact force of the nipper is the same, the magnitude of the resistance of the recording material S with respect to the oscillation operation of the registration roller 27 varies. For example, in the case of the recording material S having low surface smoothness, since the resistance tends to increase with respect to the pressure contact force of the nipper, it is preferable to increase the correction amount of the oscillation operation and increase the drive amount of the registration roller 27. Furthermore, in the case of the recording material S having a large thickness, since the resistance tends to increase with respect to the pressure contact force of the nipper, it is preferable to increase the correction amount of the oscillation operation and increase the drive amount of the registration roller 27. As described above, in order to accurately perform the deviation correction of the recording material S, it is preferable that the correction amounts according to conditions such as the correction amounts corresponding to the recording material characteristics together with the pressure contact force of the nipper are stored in the oscillation control table.

The communicator 13 includes various interfaces such as a network interface card (NIC), a modulator-demodulator (MODEM), and a universal serial bus (USB), and is connected to an external device.

The operator 14 outputs various types of information set by the user to the controller 11. As the operator 14, for example, a touch panel capable of performing an input operation according to information displayed on a display can be used. Through the operator 14, the user can set printing conditions, that is, the type of the recording material S (for example, basis weight, size, paper quality, and the like), the sheet feeding tray to be used, the density and magnification of the image, the presence or absence of double-sided printing, and the like. Further, the user can input a job execution command and an operation command in an adjustment mode through the operator 14. Further, the controller 11 can display various messages to the user via the operator 14 by controlling the operator 14.

The registration sensor SE1 detects the arrival of the leading end of the recording material S and transmits the detection result to the controller 11. Thus, the detection result of the registration sensor SE1 is used by the controller 11 to detect the rotation start timing of the registration roller 27, or the like.

The position detection sensor SE2 detects the position of the side end portion of the recording material S in the recording material width direction CD, and transmits the detection result to the controller 11. The detection result of the position detection sensor SE2 is used by the controller 11 to determine the movement amount in the oscillation operation of the registration roller 27 and to grasp the timing at which the leading end of the recording material S enters the secondary transfer roller 9.

The registration oscillation driver 34 is coupled to the registration roller 27, and is mainly configured by an electric motor. The registration roller 27 is driven by the registration oscillation driver 34 to perform a so-called oscillation operation of moving the registration roller 27 in a conveyance intersecting direction CD with a predetermined home position as a starting point.

The pressure detection sensor SE3 is used to detect the pressure contact forces of the nippers at the intermediate conveyance rollers 23, 24, and 25 and the loop roller 26 of the recording material conveyor 20, and the fixing roller 51 and the pressure roller 52 of the fixer 50. The pressure detection sensor SE3 receives information from the pressure detection sensor SE3 disposed in each roller of the recording material conveyor 20, and detects the pressure contact force of the nipper of each roller.

Further, adjustment of the pressure contact force of each nipper and switching between the pressure contact state and the separated state are controlled by the controller 11. For example, the controller 11 can control the pressure contact force of the conveyance nipper of the intermediate conveyance rollers 23, 24, and 25 and the loop roller 26 of the recording material conveyor 20 during conveyance of the recording material S, the pressure contact force of the fixing nipper between the secondary transfer roller 9 and the counter roller 8 of the image former 10, and the pressure contact force of the fixing nipper between the fixing roller 51 and the pressure roller 52 of the fixer 50 by adjusting the gap of the roller pair constituting each nipper.

The medium sensor SE4 is a recording material characteristic detector for detecting the recording material characteristics of the recording material S. The medium sensor SE4 detects, for example, the type (paper type) and dimensions (size) of the recording material S, physical properties of the recording material S, and the like. As the physical properties of the recording material S, the medium sensor SE4 detects, for example, a thickness, a basis weight, a surface state such as smoothness, rigidity, a charge amount, a water content, a paper grain (an angle of the recording material in a fiber direction), and the like.

[Registration Oscillator]

(Configuration of Oscillator)

Figure 4:
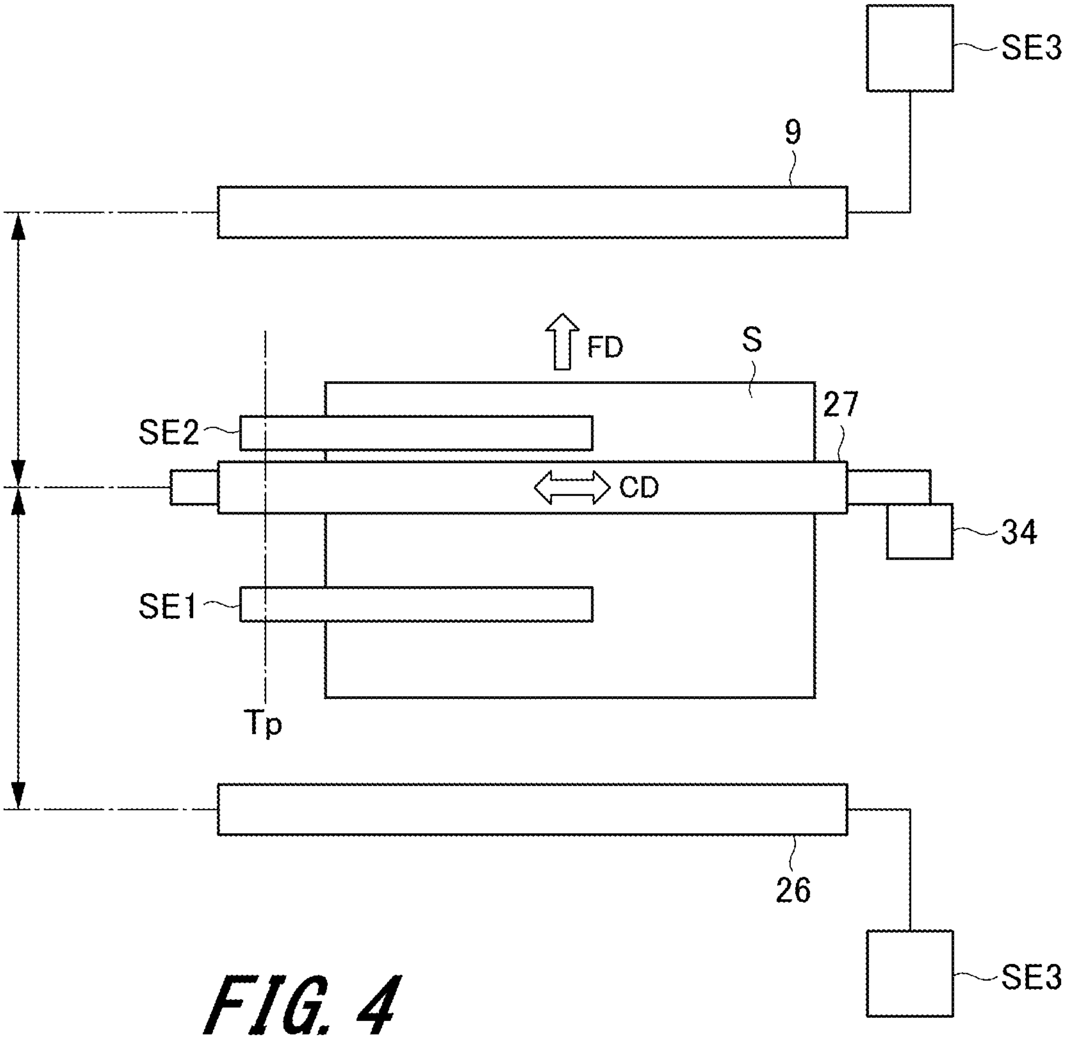
FIG. 4 is a diagram illustrating a peripheral configuration related to oscillation processing of a registration roller of an image forming apparatus.

Next, the oscillation processing of the recording material S by the registration roller 27 in the image forming apparatus 100 will be described. FIG. 4 illustrates a configuration around the registration roller 27 related to the oscillation processing in the image forming apparatus 100.

FIG. 4 illustrates the registration roller 27 that oscillates the recording material S, the registration oscillation driver 34 that oscillates the registration roller 27, the registration sensor SE1 that detects the arrival of the recording material S disposed on the upstream side of the registration roller 27, and the position detection sensor SE2 that detects the deviation of the recording material S disposed on the downstream side of the registration roller 27. Further, in FIG. 4, the distances from the registration roller 27 to the transfer nipper of the secondary transfer roller 9 and to the conveyance nipper of the loop roller 26 are indicated by arrows.

Furthermore, FIG. 4 illustrates the secondary transfer roller 9 disposed on the downstream side of the registration roller 27, the loop roller 26 disposed on the upstream side of the registration roller 27, and the pressure detection sensors SE3 that detect the pressure contact forces of the nippers installed at the secondary transfer roller 9 and the loop roller 26. In the image forming apparatus 100, the position detection sensor SE2 corresponds to a deviation detector that detects deviation of the recording material S. Further, the registration roller 27 and the registration oscillation driver 34 correspond to a deviation corrector that corrects the deviation of the recording material by moving the recording material S in the conveyance intersecting direction.

The registration roller 27 is configured to be capable of oscillation in a direction (conveyance intersecting direction CD, main scanning direction) orthogonal to a recording material conveyance direction FD. The registration roller 27 is coupled to the registration oscillation driver 34 mainly configured by an electric motor. Then, the registration roller 27 moves in the conveyance intersecting direction CD from a predetermined home position as a starting point by the driving of the registration oscillation driver 34.

The registration roller 27 moves along the conveyance intersecting direction CD in accordance with the period in which the recording material S passes and moves the conveyed recording material S along the conveyance intersecting direction CD (oscillation processing). Thus, the registration roller 27 corrects the deviation of the conveyed recording material S in the conveyance intersecting direction CD and adjusts the conveyance position of the recording material S for alignment with the position of the toner image to be transferred.

Here, the position where the side end portion of the recording material S passes in a case where there is no deviation in the conveyance intersecting direction CD is the target position Tp. The target position Tp is a position (optimum image position) at which the positional relationship between the recording material S and the toner image becomes optimum when the side end portion of the recording material S passes through the position in the conveyance intersecting direction CD. The registration roller 27 adjusts the conveyance position of the recording material S in the conveyance intersecting direction CD such that the side end portion of the recording material S becomes the target position Tp.

The conveyance path is provided with the registration sensor SE1 and the position detection sensor SE2.

The controller 11 controls the operation of the registration roller 27 on the basis of the detection results of the registration sensor SE1 and the position detection sensor SE2.

The registration sensor SE1 is disposed between the registration roller 27 and the loop roller 26 in the conveyance path. The registration sensor SE1 detects the arrival of the leading end of the recording material S at a predetermined position on the upstream side of the registration roller 27.

The position detection sensor SE2 is disposed between the registration roller 27 and the secondary transfer roller 9 in the conveyance path. The position detection sensor SE2 detects a displacement amount (deviation amount) between the target position Tp and the position of passage of the side end portion of the recording material S in the conveyance intersecting direction CD.

(Registration Oscillation Control)

Figure 5:
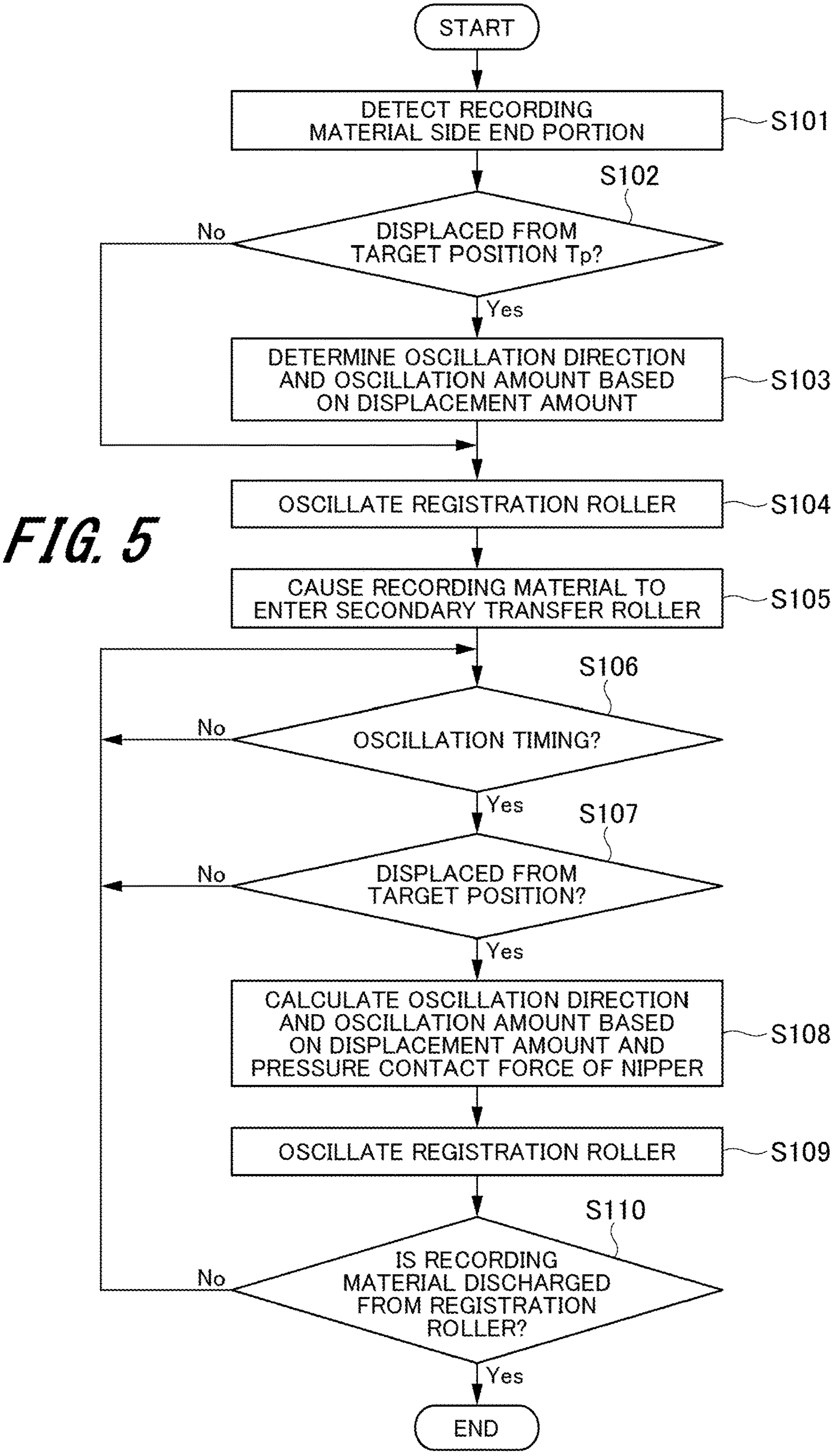
FIG. 5 is a flowchart of oscillation processing by a registration roller.

Next, control processing of the oscillation operation by the registration roller 27 will be described. FIG. 5 is a flowchart of the oscillation control processing for controlling the oscillation operation of the registration roller 27.

First, when a job is started, the position detection sensor SE2 detects the position of the side end portion of the recording material S (step S101).

The controller 11 determines whether the side end portion of the recording material S is displaced from the target position Tp on the basis of the detection result by the position detection sensor SE2 and the target position Tp (step S102).

When the side end portion of the recording material S is displaced from the target position Tp (Yes in step S102), the oscillation amount and the oscillation direction of the registration roller 27 are determined from the oscillation control information stored in the storage 12 on the basis of the displacement amount (deviation amount) between the position of the side end portion of the recording material S detected by the position detection sensor SE2 and the target position Tp (step S103).

The controller 11 drives the registration oscillation driver 34 in accordance with the determined oscillation amount and oscillation direction of the registration roller 27, and executes the oscillation operation (first oscillation operation) of the registration roller 27 (step S104).

After the oscillation of the registration roller 27 is stopped or when the side end portion of the recording material S is not displaced from the target position Tp (No in step S102), the recording material S is caused to enter the secondary transfer roller 9 without performing the oscillation operation of the registration roller 27 (step S105).

Next, the controller 11 determines whether the oscillation timing has arrived (step S106). In a case where the oscillation timing has not arrived (No in step S106), the controller 11 waits until the oscillation timing arrives. The oscillation timing is set every time a predetermined time elapses after the recording material S enters the secondary transfer roller 9.

In a case where the oscillation timing has arrived (Yes in step S106), the controller 11 determines whether the side end portion of the recording material S is displaced from the target position Tp on the basis of the detection result by the position detection sensor SE2 and the target position Tp (step S107).

In a case where the side end portion of the recording material S is not displaced from the target position Tp (No in step S107), the controller 11 waits until a next oscillation timing arrives.

When the side end portion of the recording material S is displaced from the target position Tp (Yes in step S107), the oscillation amount and the oscillation direction of the registration roller 27 are determined on the basis of the deviation amount of the recording material S detected by the position detection sensor SE2 and the pressure contact force of the nipper during conveyance of the recording material S (step S108). In step S108, the controller 11 calculates provisional values of the oscillation amount and the oscillation direction of the registration roller 27 from the oscillation control information stored in the storage 12 on the basis of the deviation amount detected by the position detection sensor SE2. Furthermore, the controller 11 calculates the correction amount of the oscillation amount from the oscillation control table for correcting the oscillation operation stored in the storage 12 on the basis of the pressure contact force of the nipper during conveyance of the recording material S and the recording material characteristics of the recording material S. Then, the provisional value of the calculated oscillation amount is corrected with a correction value, and execution values of the oscillation amount and oscillation direction of the registration roller 27 are calculated.

In the correction of the oscillation amount by the pressure contact force of the nipper, the pressure contact force of any one or more nippers nipping the recording material S subjected to the oscillation processing by the registration roller 27 is taken into consideration. For example, the pressure contact force of any one or more of the transfer nipper, the fixing nipper, and the conveyance nipper that nip the conveyed recording material S is taken into consideration. Further, regarding the conveyance nipper, the pressure contact force of any one or more of the intermediate conveyance rollers 23, 24, and 25 and the loop roller 26, preferably, the loop roller 26 closest to the registration roller 27 is taken into consideration.

In the image forming apparatus 100, the pressure contact force at the transfer nip of the secondary transferer and the fixing nipper of the fixer 50 can be switched in order to satisfy the conveyability and the image quality. For example, when the recording material S is an envelope, the pressure contact force of the transfer nip is reduced to suppress wrinkles.

Further, in a case where the recording material S has large irregularities such as embossed paper, the pressure contact force of the transfer nip of the secondary transferer is increased in order to enhance the adhesion between the irregularities and the transferer member (intermediate transfer belt) and improve the transferability. Further, in each conveyance roller in the recording material conveyor 20, switching can be performed according to the position in the recording material S being conveyed, and the pressure contact force of the nipper can be changed at each of the leading end portion, the center portion, and the trailing end portion of the recording material S.

In the oscillation operation of the registration roller 27, the resistance to the oscillation of the recording material S in the conveyance intersecting direction CD increases as the pressure contact force of the nipper where the recording material S is nipped increases. In a case where the recording material S is oscillated in such a state, slip hardly occurs between the recording material S and the roller, and the oscillation amount of the recording material S becomes smaller than the oscillation amount of the registration roller 27. Therefore, in a case where the pressure contact force of the nipper is large, it is necessary to correct the oscillation amount determined on the basis of the deviation amount of the recording material S in a direction of further increasing the oscillation amount according to the pressure contact force of the nipper.

In the oscillation operation of the registration roller 27, the influence of the pressure contact force of the nipper increases as the roller or the like nipping the recording material S is closer to the registration roller 27. Therefore, the correction amount of the final oscillation amount according to the pressure contact force of the nipper may be determined according to the pressure contact force of the nipper of each roller and the distance between each roller and the registration roller 27.

For example, the increase in the pressure contact force of the transfer nipper at a short distance from the registration roller 27 preferably has a larger influence on the oscillation amount (correction amount) than the increase in the pressure contact force of the nipper (fixing nipper or conveyance nipper) of the roller at a long distance from the registration roller 27.

Further, the recording material S is displaced (deviated) in the conveyance intersecting direction CD even during the conveyance of the recording material due to misalignment of the secondary transfer roller 9 and the fixing roller 51 and a difference in roller diameter between the front side and the back side of each roller (conveyance roller or the like). The recording material after passing through the secondary transfer roller is subjected to the registration oscillation operation determination each time a predetermined time elapses until the recording material is discharged from the registration roller 27, and the oscillation operation is performed when the recording material is displaced from the target position. Therefore, it is possible to correct the deviation of the recording material S by correcting the position of the side end portion of the recording material S not only at the leading end of the recording material S but also at the intermediate portion or the trailing end side. For example, it is possible to correct subscanning bending that is significantly generated in a recording material long in the recording material conveyance direction such as a long sheet.

Next, the controller 11 drives the registration oscillation driver 34 in accordance with the determined oscillation amount and oscillation direction of the registration roller 27 and oscillates (second oscillation operation) the registration roller 27 (step S109).

After the oscillation processing of the registration roller 27, it is determined whether the recording material S has been discharged from the registration roller 27 (step S110). The controller 11 detects the passage of the trailing end portion of the recording material S with the registration sensor SE1 or the position detection sensor SE2, and determines whether or not the recording material S has been discharged from the registration roller 27 on the basis of the detection.

In a case where the recording material S is not discharged from the registration roller 27 (No in step S110), the controller 11 waits until a next oscillation timing arrives.

When the recording material S has been discharged from the registration roller 27 (Yes in step S110), the processing according to this flowchart ends.

<2. Second Embodiment of Image Forming Apparatus>

Next, a second embodiment of an image forming apparatus will be described. The image forming apparatus of the second embodiment includes, as a configuration of a controller, a machine learner that learns an oscillation amount of a registration roller (deviation corrector) according to a nip pressure contact force by machine learning. Note that a configuration similar to that of the image forming apparatus of the first embodiment described above can be applied to the configurations other than the configuration of including the machine learner. Therefore, detailed description of the same configuration as that of the aforementioned first embodiment will be omitted.

[Configuration of Machine Learner]

Figure 6:
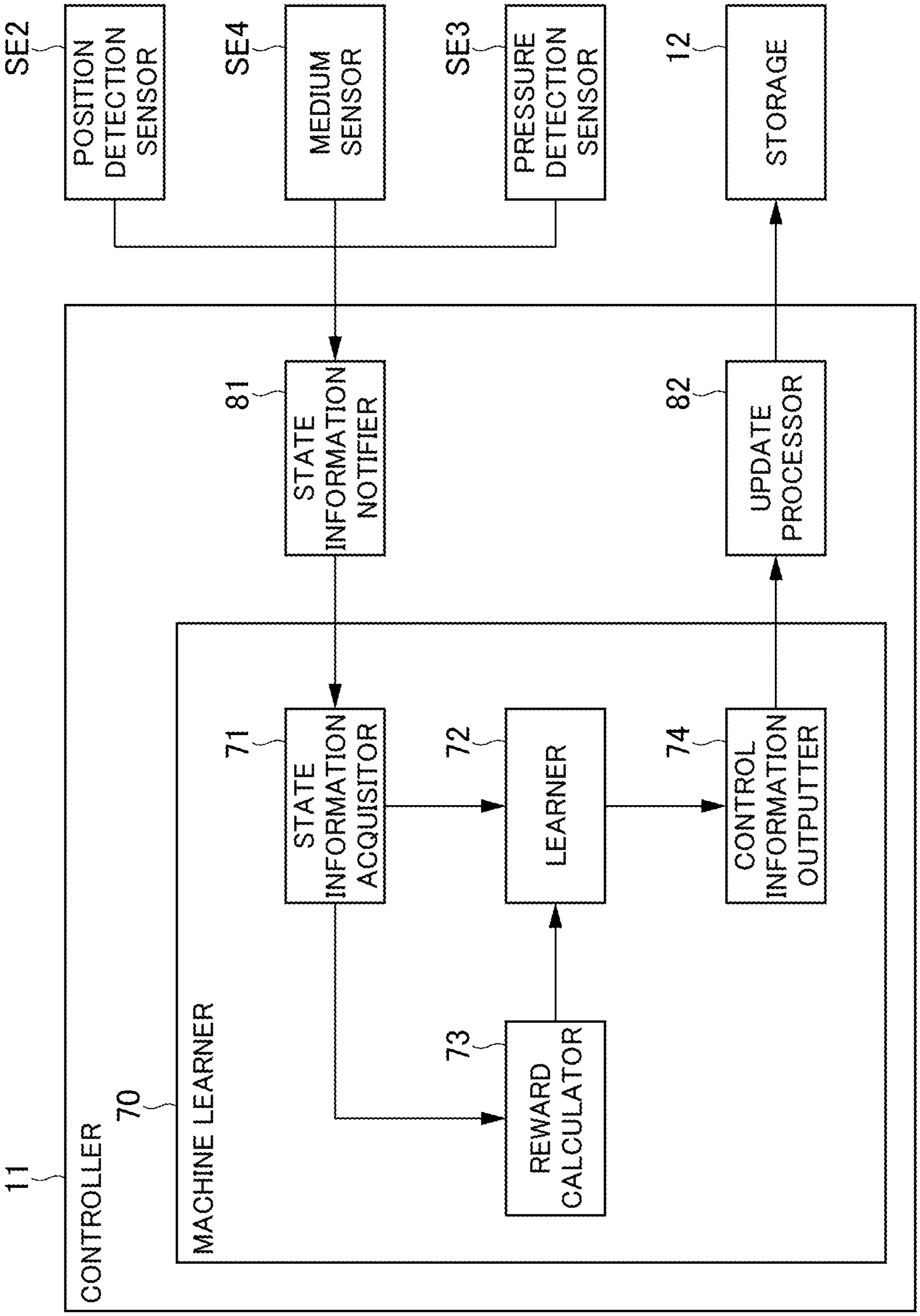
FIG. 6 is a block diagram illustrating a functional configuration of a machine learner in a controller of an image forming apparatus.

FIG. 6 is a block diagram illustrating a functional configuration of a machine learner in a controller. FIG. 6 illustrates an example in which a machine learner 70 is provided in a controller 11. The machine learner 70 determines the pressure contact force of a nipper in an image forming apparatus 100 and an oscillation amount according to recording material characteristics by machine learning (reinforcement learning).

The controller 11 includes a state information notifier 81 and an update processor 82. The controller 11 outputs and inputs information with respect to a position detection sensor SE2, a pressure detection sensor SE3, a medium sensor SE4, and a storage 12 of the image forming apparatus 100.

The machine learner 70 includes a state information acquisitor 71, a learner 72, a reward calculator 73, and a control information outputter 74.

In FIG. 6, the position detection sensor SE2 detects a displacement amount (deviation amount) between the position of the side end portion of a recording material S on a registration roller 27 and a target position Tp, and transmits the displacement amount to the state information notifier 81. The pressure detection sensor SE3 detects the pressure contact force of the nipper on the detected recording material S being conveyed, and transmits the pressure contact force to the state information notifier 81. The medium sensor SE4 detects recording material characteristics of the recording material S and transmits the recording material characteristics to the state information notifier 81.

The state information notifier 81 notifies the machine learner 70 of the deviation amount, the pressure contact force of the nipper, and the recording material characteristics received from the position detection sensor SE2, the pressure detection sensor SE3, and the medium sensor SE4 as the state information of the recording material S in the image forming apparatus 100.

The update processor 82 receives new oscillation control information calculated by the machine learner 70 from the control information outputter 74, and updates the information of the oscillation control table for correcting the oscillation control stored in the storage 12.

The state information acquisitor 71 acquires the deviation amount, the pressure contact force of the nipper, and the recording material characteristics as the state information from the state information notifier 81.

The learner 72 starts learning using the pressure contact force of the nipper and the recording material characteristics of the recording material S from the state information acquisitor 71 as an input and the oscillation amount of the registration oscillation driver 34 as an output. Further, the learner 72 calculates the oscillation amount of the registration oscillation driver 34 having the highest action value as oscillation control information on the basis of the pressure contact force of the nipper, the recording material physical properties of the recording material S being conveyed, and the reward calculated by the reward calculator 73.

The reward calculator 73 calculates a reward to be stored on the basis of the detection value (deviation amount) of the position detection sensor SE2 after the oscillation operation of the registration roller 27. The reward calculator 73 calculates and stores a positive reward when the displacement amount (deviation amount) between the position of the side end portion of the recording material S and the target position Tp is less than a certain amount, and calculates and stores a negative reward when the displacement amount is equal to or more than the certain amount.

The control information outputter 74 receives and outputs new oscillation control information calculated by the learner 72 on the basis of the pressure contact force of the nipper, the recording material physical properties, and the reward calculated by the reward calculator 73, and updates the oscillation control information stored in the storage 12 of the image forming apparatus 100.

By performing machine learning (reinforcement learning), the image forming apparatus 100 can determine the optimum correction amount according to the combined state of the pressure contact force of each nipper on the recording material S in the conveyance path such as the secondary transferer and the fixer and recording material characteristic data. Therefore, it is possible to reduce image position displacement due to the deviation of the recording material S.

[Machine Learning Processing]

Figure 7:
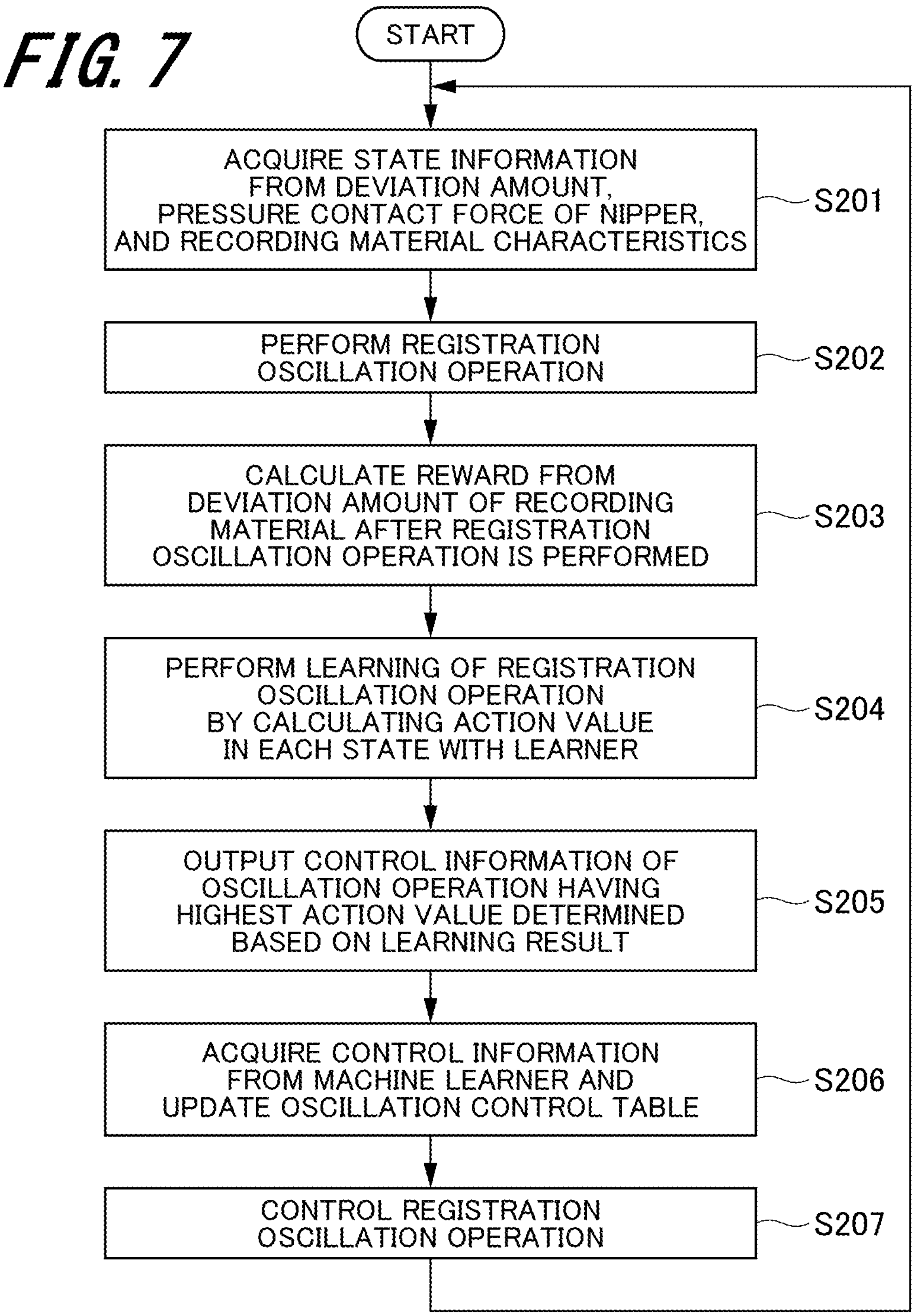
FIG. 7 is a flowchart of machine learning processing by a machine learner.

Next, machine learning processing by the machine learner 70 described above will be described. FIG. 7 illustrates a flowchart of machine learning processing by the machine learner 70. The machine learner 70 starts learning using the pressure contact force of the nipper of each roller pair on the recording material and the recording material characteristics as an input and the oscillation amount of the registration roller 27 as an output.

First, the state information acquisitor 71 of the machine learner 70 acquires the state information of the recording material S in the image forming apparatus 100 from the state information notifier 81 (step S201). The state information acquisitor 71 acquires, for example, the deviation amount detected by the position detection sensor SE2 of the image forming apparatus 100, the pressure contact force at each nipper on the recording material S being conveyed detected by the pressure detection sensor SE3, and the recording material characteristics detected by the medium sensor SE4 as the state information from the state information notifier 81.

Next, the registration oscillation driver 34 is driven to perform the oscillation operation of the registration roller 27 (step S202). For the oscillation operation of the registration roller 27, the first oscillation operation and the second oscillation operation are executed according to the flowchart illustrated in FIG. 4 of the first embodiment described above.

Next, after performing the second oscillation operation of the registration roller 27, the reward calculator 73 calculates a reward from the deviation amount detected by the position detection sensor SE2 (step S203). The reward calculator 73 calculates a positive reward when the displacement amount between the position of the side end portion of the recording material S and the target position Tp is less than a certain amount, and calculates a negative reward when the displacement amount is equal to or more than the certain amount on the basis of the value of the position detection sensor after the second oscillation operation.

Next, the learner 72 learns the oscillation operation of the registration roller 27 by calculating the oscillation operation (correction amount) having the highest action value according to the pressure contact force of the nipper, the recording material physical properties of the recording material S, and the reward calculated by the reward calculator 73 (step S204).

Then, the learner 72 outputs the control information of the oscillation operation (correction amount) having the highest action value determined on the basis of the learning result to the control information outputter 74 (step S205).

The control information outputter 74 receives the new oscillation control information calculated by the machine learner 70 and outputs the oscillation control information to the update processor 82, and the update processor 82 updates the correction amount of the oscillation control table stored in the storage 12 (step S206).

The controller 11 controls the second oscillation operation of the registration roller 27 on the basis of the information of the updated oscillation control table (step S207). Then, the machine learner 70 performs machine learning (reinforcement learning) by repeating the processing from steps S201 to S207.

The machine learner 70 described above can determine the optimum correction amount with respect to the oscillation operation of the registration roller 27 according to the combined state of the pressure contact force of the nipper (transfer nipper, fixing nipper, conveyance nipper, and the like) nipping the recording material S being conveyed and the recording material characteristics by machine learning (reinforcement learning). Thus, the deviation of the recording material can be sufficiently corrected by the oscillation operation of the registration roller 27, and the positional displacement of the image formation with respect to the recording material S can be reduced.

Note that the present invention is not limited to the configuration described in the above-described embodiment example, and various modifications and changes can be made without departing from the configuration of the present invention.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

1Y, 1M, 1C, 1K . . . photoreceptor drum
2Y, 2M, 2C, 2K . . . charger
3Y, 3M, 3C, 3K . . . optical writer
4Y, 4M, 4C, 4K . . . developer
5Y, 5M, 5C, 5K . . . drum cleaner
6 . . . intermediate transfer belt
7Y, 7M, 7C, 7K . . . primary transfer roller
8 . . . counter roller
9 . . . secondary transfer roller
10 . . . image former
10C, 10K, 10M, 10Y . . . image forming unit
11 . . . controller
12 . . . storage
13 . . . communicator
14 . . . operator
20 . . . recording material conveyor
21 . . . sheet feeding tray
22 . . . sheet feeder
23 . . . intermediate conveyance roller
26 . . . loop roller
27 . . . registration roller
28 . . . sheet discharge roller
29 . . . sheet discharge tray
34 . . . registration oscillation driver
50 . . . fixer
51 . . . fixing roller
52 . . . pressure roller
60 . . . image reader
70 . . . machine learner
71 . . . state information acquisitor
72 . . . learner
73 . . . reward calculator
74 . . . control information outputter
81 . . . state information notifier
82 . . . update processor
100 . . . image forming apparatus
SE1 . . . registration sensor
SE2 . . . position detection sensor
SE3 . . . pressure detection sensor
SE4 . . . medium sensor

The invention claimed is:

1. An image forming apparatus that nips a recording material with a nipper and conveys the recording material, the image forming apparatus comprising:
- a conveyor that conveys the recording material;
- a transferer that includes a transfer roller that transfers a toner image onto the recording material;
- a fixer that includes a fixing roller that fixes the toner image formed on the recording material;
- a deviation detector that detects a position of the recording material in a conveyance intersecting direction;
- a deviation corrector that is located on an upstream side of the transferer and moves the recording material in the conveyance intersecting direction to correct deviation of the recording material;
- a pressure detector that detects a pressure contact force of the nipper; and
- a controller that controls a drive amount of the deviation corrector on a basis of a detection result of the deviation detector and the pressure contact force of the nipper detected by the pressure detector.

2. The image forming apparatus according to claim 1, wherein the controller controls the drive amount of the deviation corrector on a basis of the pressure contact force of any one or more of a conveyance nipper of a roller pair of the conveyor, a transfer nipper of the transfer roller of the transferer, and a fixing nipper of the fixing roller that fixes the toner image as the nipper.

3. The image forming apparatus according to claim 1, wherein the controller stores a control table for controlling the drive amount of the deviation corrector, and controls the drive amount of the deviation corrector on a basis of a detection result of the deviation detector and the control table.

4. The image forming apparatus according to claim 1, wherein the controller controls the pressure contact force of the nipper.

5. The image forming apparatus according to claim 4, wherein the controller increases the drive amount of the deviation corrector when the pressure contact force of the nipper is increased.

6. The image forming apparatus according to claim 1, wherein the controller increases the drive amount of the deviation corrector when a distance between the deviation corrector and the nipper is shorter.

7. The image forming apparatus according to claim 1, wherein the controller increases the drive amount of the deviation corrector according to a position of the recording material where the deviation corrector corrects deviation.

8. The image forming apparatus according to claim 1, comprising:

a recording material characteristic detector that detects characteristics of the recording material, wherein the controller controls the drive amount of the deviation corrector according to recording material characteristics detected by the recording material characteristic detector.

9. The image forming apparatus according to claim 8, wherein the controller increases the drive amount of the deviation corrector when the recording material is embossed paper.

10. The image forming apparatus according to claim 8, wherein the controller increases the drive amount of the deviation corrector when the recording material is an envelope.

11. The image forming apparatus according to claim 8, wherein the recording material characteristic detector detects one or more of a sheet type, a sheet thickness, a basis weight, a recording material size, and a surface smoothness as the recording material characteristics.

12. The image forming apparatus according to claim 1, wherein the controller includes a machine learner that learns the drive amount of the deviation corrector by machine learning, the machine learner has a learning model that uses a pressure contact force of at least one of the transfer roller and a roller pair of the conveyor and physical properties of the recording material as an input, and outputs the drive amount of the recording material by the deviation corrector, and calculates a reward value according to whether or not the deviation amount of the recording material after deviation correction is within a predetermined range, and the controller controls the deviation corrector on a basis of the drive amount of the deviation corrector obtained by the learning model.

* * * * *